(12) United States Patent
Cholewa et al.

(10) Patent No.: US 10,442,313 B2
(45) Date of Patent: Oct. 15, 2019

(54) ELECTRIC MINING VEHICLE, CHARGE CONTROLLER, AND RELATED PROCESS

(71) Applicant: MEDATECH ENGINEERING SERVICES LTD., Collingwood (CA)

(72) Inventors: Pawel Cholewa, Collingwood (CA); Robert Rennie, Collingwood (CA)

(73) Assignee: MEDATECH ENGINEERING SERVICES LTD., Collingwood (CA)

( * ) Notice: Subject to any disclaimer, the term of this patent is extended or adjusted under 35 U.S.C. 154(b) by 0 days.

(21) Appl. No.: 15/787,766

(22) Filed: Oct. 19, 2017

(65) Prior Publication Data

US 2018/0111496 A1 Apr. 26, 2018

Related U.S. Application Data

(60) Provisional application No. 62/410,938, filed on Oct. 21, 2016.

(51) Int. Cl.
*B60L 58/12* (2019.01)
*B60L 1/00* (2006.01)
*B60L 7/14* (2006.01)
*E21F 13/04* (2006.01)
*B60L 1/02* (2006.01)
(Continued)

(52) U.S. Cl.
CPC ............... *B60L 58/12* (2019.02); *B60L 1/003* (2013.01); *B60L 1/02* (2013.01); *B60L 7/14* (2013.01); *B60L 7/18* (2013.01); *B60L 15/2018* (2013.01); *B60L 53/11* (2019.02); *B60L 58/13* (2019.02); *B60L 58/15* (2019.02); *B60L 58/26* (2019.02); *E21F 13/04* (2013.01); *B60L 1/14* (2013.01); *B60L 2200/40* (2013.01); *B60L 2210/10* (2013.01); *B60L 2240/12* (2013.01); *B60L 2240/423* (2013.01); *B60L 2240/642* (2013.01); *B60L 2260/54* (2013.01); *Y02T 10/645* (2013.01); *Y02T 10/7005* (2013.01); *Y02T 10/705* (2013.01); *Y02T 10/7044* (2013.01); *Y02T 10/7072* (2013.01); *Y02T 10/7216* (2013.01); *Y02T 10/7275* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01)

(58) Field of Classification Search
CPC ....... B60L 11/1861; B60L 58/15; B60L 58/13
See application file for complete search history.

(56) References Cited

U.S. PATENT DOCUMENTS 8,700,283 B2   4/2014 Lammers
9,166,224 B2 * 10/2015 Yu .......................... H01M 4/131
(Continued)

FOREIGN PATENT DOCUMENTS

JP         2000299901 A     10/2000

*Primary Examiner* — James A Shriver, II
*Assistant Examiner* — James J Triggs
(74) *Attorney, Agent, or Firm* — Perry + Currier Inc.

(57) ABSTRACT

A charge controller for an electric mining vehicle is configured to determine an amount of charge to be provided to a battery of the electric mining vehicle for an upcoming trip based on regenerative braking power generation and load indication measured during a previous trip. The charge controller is further configured to command a battery charger to charge the battery up to the determined amount of charge and to stop charging the battery once the determined amount of charge has been reached.

20 Claims, 5 Drawing Sheets

(51) Int. Cl.
*B60L 7/18* (2006.01)
*B60L 15/20* (2006.01)
*B60L 53/10* (2019.01)
*B60L 58/13* (2019.01)
*B60L 58/26* (2019.01)
*B60L 58/15* (2019.01)
*B60L 1/14* (2006.01)

(56) References Cited

U.S. PATENT DOCUMENTS

| | | |
|---|---|---|
| 9,545,854 B2 | 1/2017 | Daum et al. |
| 2015/0097512 A1* | 4/2015 | Li .................... B60L 11/182 320/101 |

* cited by examiner

ELECTRIC MINING VEHICLE, CHARGE CONTROLLER, AND RELATED PROCESS

CROSS-REFERENCE TO RELATED APPLICATIONS

This application claims the benefit of U.S. Provisional Patent Application Ser. No. 62/410,938, filed Oct. 21, 2016, which is incorporated herein by reference.

FIELD

The present invention relates to battery-powered electric vehicles.

BACKGROUND

Modern mining vehicles and equipment are increasingly being made electrified. The benefits of battery-powered electric drive systems are magnified when underground. No local exhaust products are produced, thereby removing or reducing the need to ventilate exhaust products from mineshafts and reducing or eliminating detrimental health effects on miners.

However, battery electrification of mining vehicles is not yet practical or possible in many situations. Haul trucks, for instance, often must ascend rising mine tunnels or pathways, a task which results in rapid drain on a vehicle battery, more so if the haul truck is fully loaded. Conventional solutions include providing charging stations at a strategic point along the tunnel on each level. While this works, it lacks acceptable efficiency. It is not unusual for a haul truck arriving at the top of a ramp to require an immediate hours-long charging stop. This necessitates an increased number of electric haul trucks in order to achieve the same level of overall productivity provided by a fleet of diesel hall trucks, which increases cost and complexity to mining operations.

Another conventional solution is to increase the size of the battery. However, in addition to practical limits to battery size in mining vehicles, larger batteries tend to be more costly, tend to reduce efficiency due to the increased energy needed to move the battery itself, and require increased time to charge.

Another known solution is described in U.S. Pat. No. 9,545,854 to Daum et al. In this patent, an energy management system calculates estimated electric loads of powering motors over one or more segments of a trip according to designated operational settings of a trip plan. The energy management system communicates a demanded amount of electric energy to one or more of plural wayside stations disposed along the route so that the wayside stations have sufficient electric energy to charge an onboard energy storage device with the electric energy to meet the estimated electric loads. The energy management system can modify a trip plan based on load parameters and charging restrictions.

SUMMARY

According to various aspects of the present invention, a charge controller for an electric mining vehicle is configured to determine an amount of charge to be provided to a battery of the electric mining vehicle for an upcoming trip based on regenerative braking power generation and load indication measured during a previous trip. The charge controller is further configured to command a battery charger to charge the battery up to the determined amount of charge and to stop charging the battery once the determined amount of charge has been reached.

According to various aspects of the present invention, a haul truck includes a drive train, an electric traction motor to drive the drive train, a traction motor controller to control the electric traction motor, a battery to provide electrical power to the electric traction motor, a regenerative braking system, and a vehicle controller that includes a charge controller. The charge controller is configured to determine an amount of charge to be provided to the battery for an upcoming trip based on regenerative braking power generation and load indication measured during a previous trip. The charge controller is further configured to command a battery charger to charge the battery up to the determined amount of charge and to stop charging the battery once the determined amount of charge has been reached.

The present invention aims to provide improvements over known techniques. For example, rather than topping up the battery at stations provided along segments of a trip, the necessary charge required for the trip may be determined and the battery may be charged up to the predicted charge, so as to reduce or minimize charging stops and/or total charging time. Trip modification are not performed to accommodate battery charge level of charging availability. Rather, battery charge level is determined for a normally fixed trip. Moreover, one charging station may be provided for a round trip, which reduces the charging infrastructure required. That is, a single charging station may be provided for a round trip and the vehicle battery is charged up to a point that is required to complete the round trip.

BRIEF DESCRIPTION OF THE DRAWINGS

The drawings illustrate, by way of example only, embodiments of the present invention.

DETAILED DESCRIPTION

Figure 1:
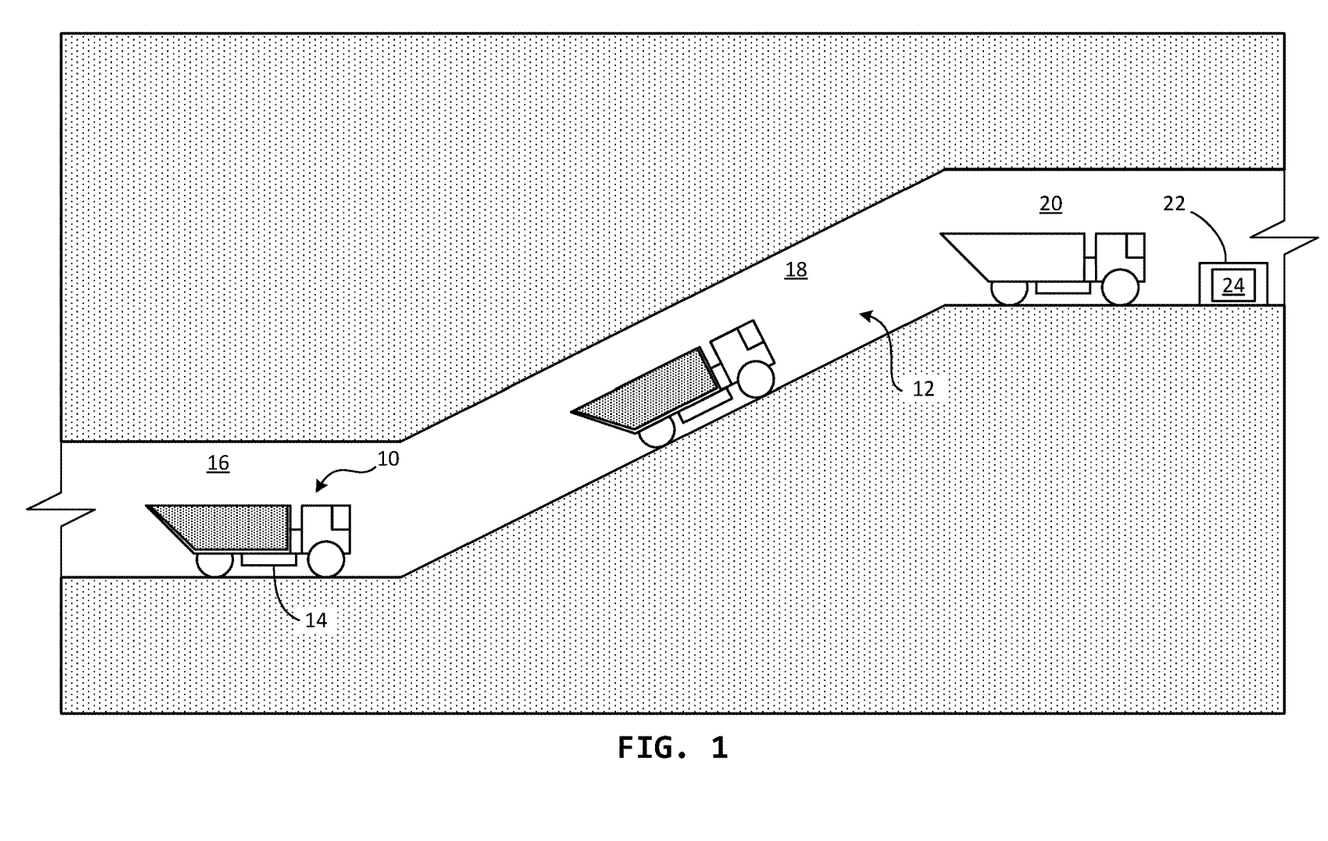
FIG. 1 is a schematic diagram of an example haul truck in a rising tunnel or similar pathway.

FIG. 1 shows a haul truck 10 according to the present invention ascending a rising mine tunnel, ramp, or other pathway 12 (e.g., a road in an open-pit mine). The haul truck 10 carries ore or waste rock between a load point and a dump point, which are often at different elevations.

The haul truck 10 includes one or more lithium-titanate (LTO) cells or batteries 14 configured to power haul truck 10. The one or more LTO cells or batteries 14 will be referred to in the below as battery 14 for sake of brevity. Using LTO chemistry for the battery 14 is particularly advantageous, as will be discussed below. However, this should not be taken as unduly limiting and other suitable battery chemistries are not excluded. Lithium nickel manganese cobalt oxide (LiNiMnCo) is another example battery chemistry that may be used. An LiNiMnCo battery may be provided with an LTO cathode.

The haul truck 10 begins its ascent at a starting length 16 of the tunnel 12. The starting length 16 may be a substantially horizontal length of the tunnel 12. The haul truck 10 ascends a rising length 18 of the tunnel 12 before arriving at a substantially horizontal ending length 20 of the tunnel 12. The rising length 18 can be rise at an even grade, as depicted, or can have a more complicated profile. Irrespective of the specific profile of the rising length 18, the ending length 20 is at a higher elevation than the starting length 16.

The starting length 16 of the tunnel 12 may be a loading area, a length of the tunnel that leads to a loading area, an unloading area or similar. The ending length 20 of the tunnel 12 may be a dumping area, a length of tunnel that leads to a dumping area, an unloading area or similar.

A stationary high-power charge station 22 is provided at the ending length 20 of the tunnel 12. The high-power charge station 22 is configured to rapidly charge the battery 14. The haul truck 10 further includes a vehicle controller that determines the amount of charge to provide to the battery 14 to reduce or minimize the time that the haul truck 10 spends at the charge station 22. In this example, the charge station 22 includes a mine-power outlet and a high-power battery charger 24 capable of providing at least approximately 500 kW. The charge station 22 preferably includes a charging cable as opposed to an indicative charging coil. However, indicative charging coils capable of sufficiently high power delivery are not excluded from use with the present invention. The battery charger 24 provides power to the battery 14 as regulated according to commands received from the vehicle controller of the haul truck 10. In this example, the battery charger 24 is external to the haul truck 10 and does not form part of the haul truck 10. In other examples, the battery charger 24 is provided onboard the haul truck 10, as integrated into the haul truck's electrical system.

Preferably, the capacity of the battery 14 is selected, in view of the location of the charge station 22, to last for one trip between visits to the charge station 22. This advantageously reduces or minimizes the size and weight of the battery 14. Thus, instead of running the haul truck for several trips and then charging it for an extended period of time, the haul truck 10 is run for one trip and then its LTO battery 14 is charged quickly using the high-power charge station 22. This increases or maximizes the haul truck's useful operating time, while reducing or eliminating the need to have additional haul trucks to compensate for down time due to extended charging stops.

Further regarding reducing or minimizing charge time, the battery 14 is specifically selected as LTO due to fast charging times afforded by LTO chemistry. The specific parameters of the LTO battery 14 are configured for fast charging with regard to the service requirement of having the battery 14 cycle through one charge and discharge cycle, with charging due to regenerative braking, once per trip.

Figure 2:
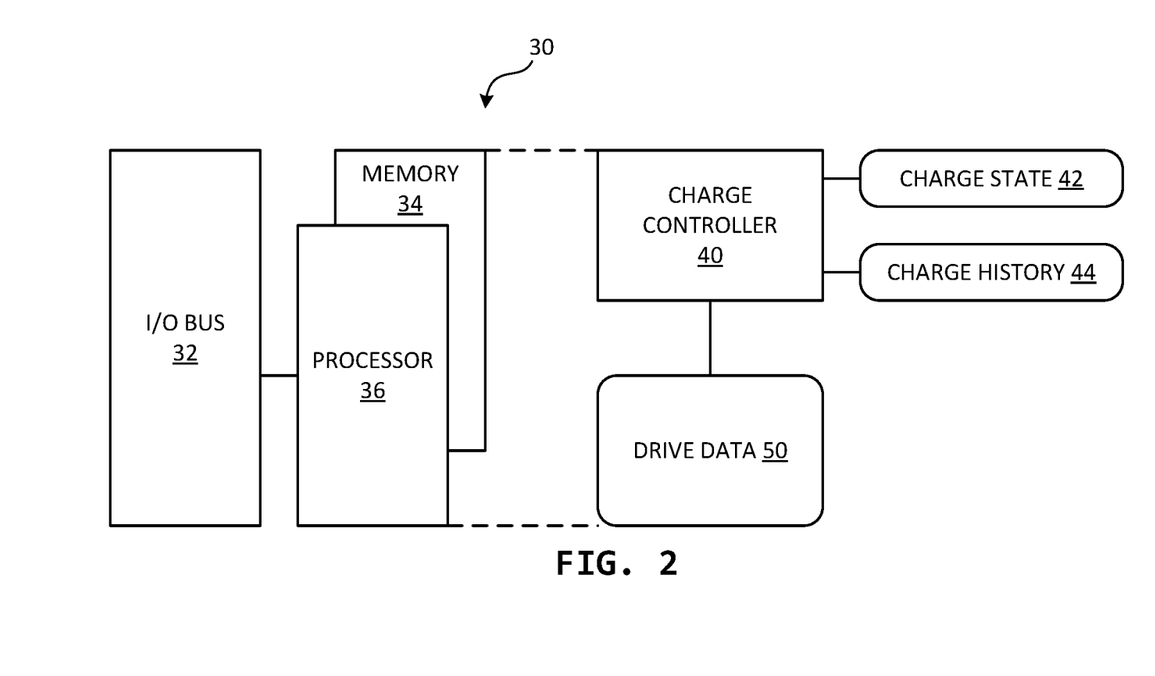
FIG. 2 is a block diagram of an example vehicle controller.

FIG. 2 shows a diagram of the vehicle controller 30.

The vehicle controller 30 includes an input/output (I/O) bus 32, memory 34, and a processor 36. The I/O bus 32 is configured for bidirectional data communications with other components of the haul truck 10. The I/O bus 32 includes a network adaptor and driver suitable for the type of network provided to the haul truck 10. In this example, the I/O bus 32 is a Controller Area Network (CAN bus) device.

The memory 34 includes any combination of read-only memory (ROM), random-access memory (RAM), flash memory, magnetic storage, optical storage, and similar for storing instructions and data as discussed herein.

The processor 36 includes one or more central-processing units (CPU), microcontrollers, microprocessors, processing cores, field-programmable gate arrays (FPGA), and similar. All or some of the memory 34 may be integrated with the processor 36. The processor 36 and memory 34 cooperate to execute instructions to cause the vehicle controller 30 to perform the functionality discussed herein.

The vehicle controller 30 includes a charge controller 40 that monitors the charge state 42 of the battery 14 and can optionally record the charge history 44 of the battery 14. The charge state 42 is an indication of the amount of charge remaining in the battery 14 (e.g., 0-100%, ampere-hours, etc.). The charge history 44 is data for charge state 42 over time. The charge controller 40 is further configured to command the charger 24 of the charging station 22 to charge the battery 14 at one or more specific charging rates up to a specific charge state. The charge controller 40 stops charging the battery 14 once the charge state has been reached, even if there is battery capacity available, so as to reduce or minimize charge time.

The vehicle controller 30 can further store drive data 50. Drive data 50 can include any one or combination of operator inputs and vehicle signals, such as accelerator pedal position, brake pedal position, gear position (e.g., forward, neutral, reverse, etc.), tram/auxiliary mode switch position, battery coolant temperature(s), battery cooler motor RPM or power consumption, compressor motor RPM or power consumption, water pump RPM or power consumption, power-steering pump RPM or power consumption, auxiliary (24 V) power consumption, traction motor controller signal(s), traction motor power consumption, differential oil temperature/pressure, a load weight or level, specific inputs from the vehicle operator, and regenerative braking power generation. Such data 50 may be captured and stored as instantaneous values, instantaneous values over time, rates, or similar. Load weight can be measured by a load cell provided to the dump box of the haul truck 10. Alternatively, a load level (e.g., full, half, empty, etc.) can be specifically inputted by the driver via a user interface (e.g., dial, button, keyboard, touchscreen, etc.) connected to the vehicle controller 30. Load weight and load level can each be considered a load indicator.

The charge controller 40 is configured to reference the charge state 42 and, optionally, any available drive data 50 and any available charge history 44 when commanding the charger 24 to charge the battery 14.

Figure 3:
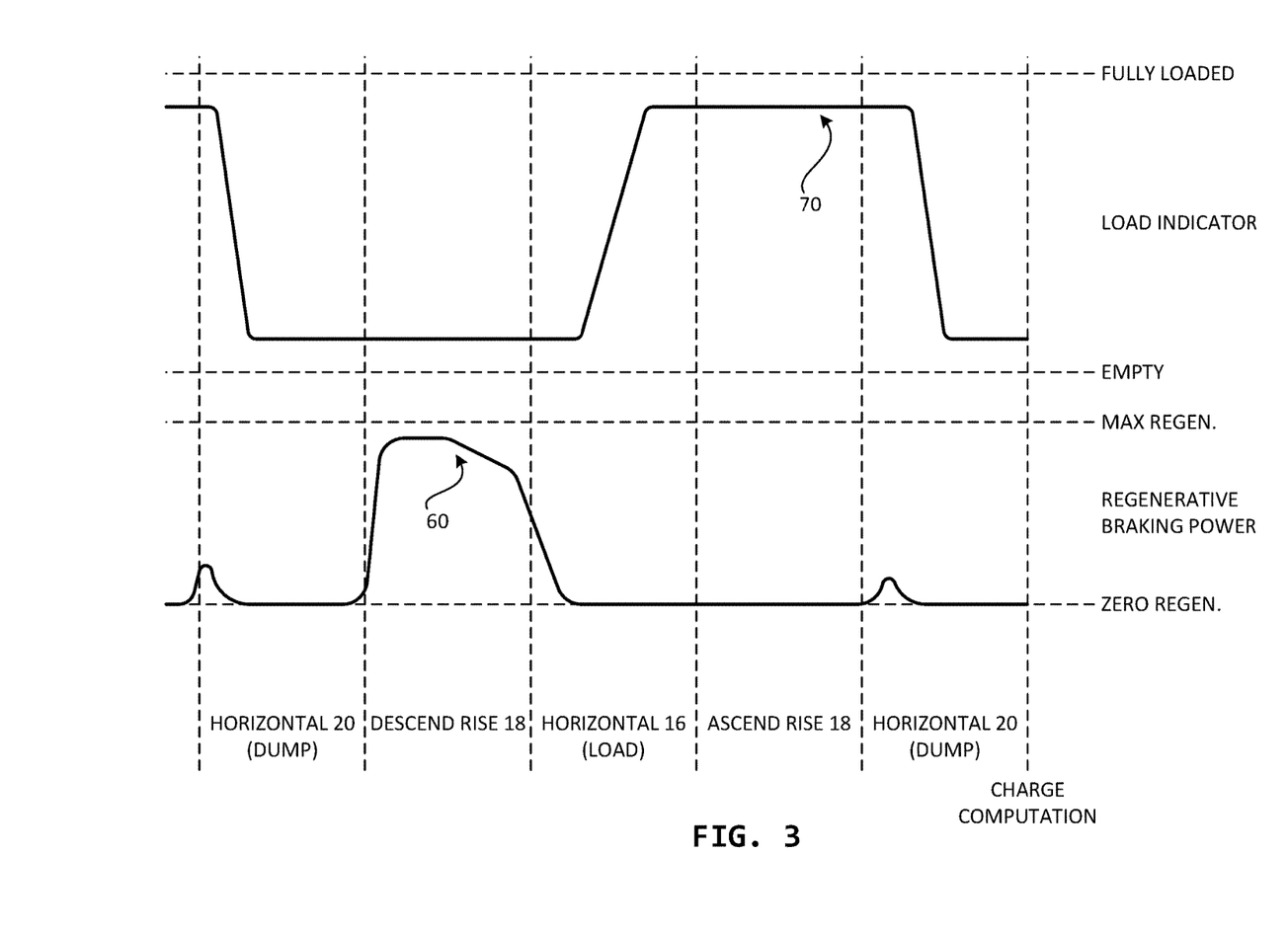
FIG. 3 is a graph of example data.

FIG. 3 shows example load indicator data and example regenerative braking power generation data over one cycle, or round trip, of the haul truck 10 driving the elevated ending length 20 of the tunnel 12, descending the rising length 18, driving the lower starting length 16, ascending the rising length 18, and finishing at the elevated ending length 20 where the charging station 22 is located. As can be seen, the majority of the regenerative braking power is generated during the descent, at 60. Further, a large power drain on the battery 14 occurs during the loaded ascent, at 70. As such, the charge controller 40 can be configured to compute the charge to be provided to the battery 14 at the charging station 22 based on a load indicator measurement 70 made during a previous ascent and based on the regenerative braking power generated 60, as measured during a previous descent. The charge controller 40 is provided with logic instructing that higher load indications require more charge from the charging station 22 and that higher regenerative braking powers require less charge from the charging station 22. Averages of measurements 60, 70 may be taken over one or more trip cycles and the charge controller 40 can be configured to compute the charge needed based on such average values. Accordingly, the charge controller 40 is configured to reduce or minimize charge time. This is achieved, at least in part, by leaving capacity in the battery 14 for any predicted regenerative braking power that will be generated.

It is also contemplated that, at least in some mines, a loading area will be elevated compared to an unloading area, and the haul truck will be generally hauling ore or waste rock downhill. The techniques discussed herein, particularly the charging of a battery to account for future regenerative braking energy gain, apply to these scenarios or can be readily adapted to these scenarios.

The above process can be adapted to allow the charge controller 40 to account for the effects of backfill loaded into the haul truck 10 for the descent back to the load point. Regenerative braking power generation will increase due to the added weight of the backfill. The charge controller 40 can be configured to account for this effect by referencing one or both of the load indicator measurement when leaving the dump point (or other point where backfill is taken on) and the regenerative braking power generated as measured during the previous descent (if backfill was taken during that trip). A backfill indication may be provided to the charge controller 40 via the load indicator or via an operator input.

The charge controller 40 can be configured similar to the above, so as to handle a path having any number of substantially horizontal sections as well as ascents and descents of any profile and length. Further, the charge controller 40 can be configured to handle any operating pattern.

Figure 4:
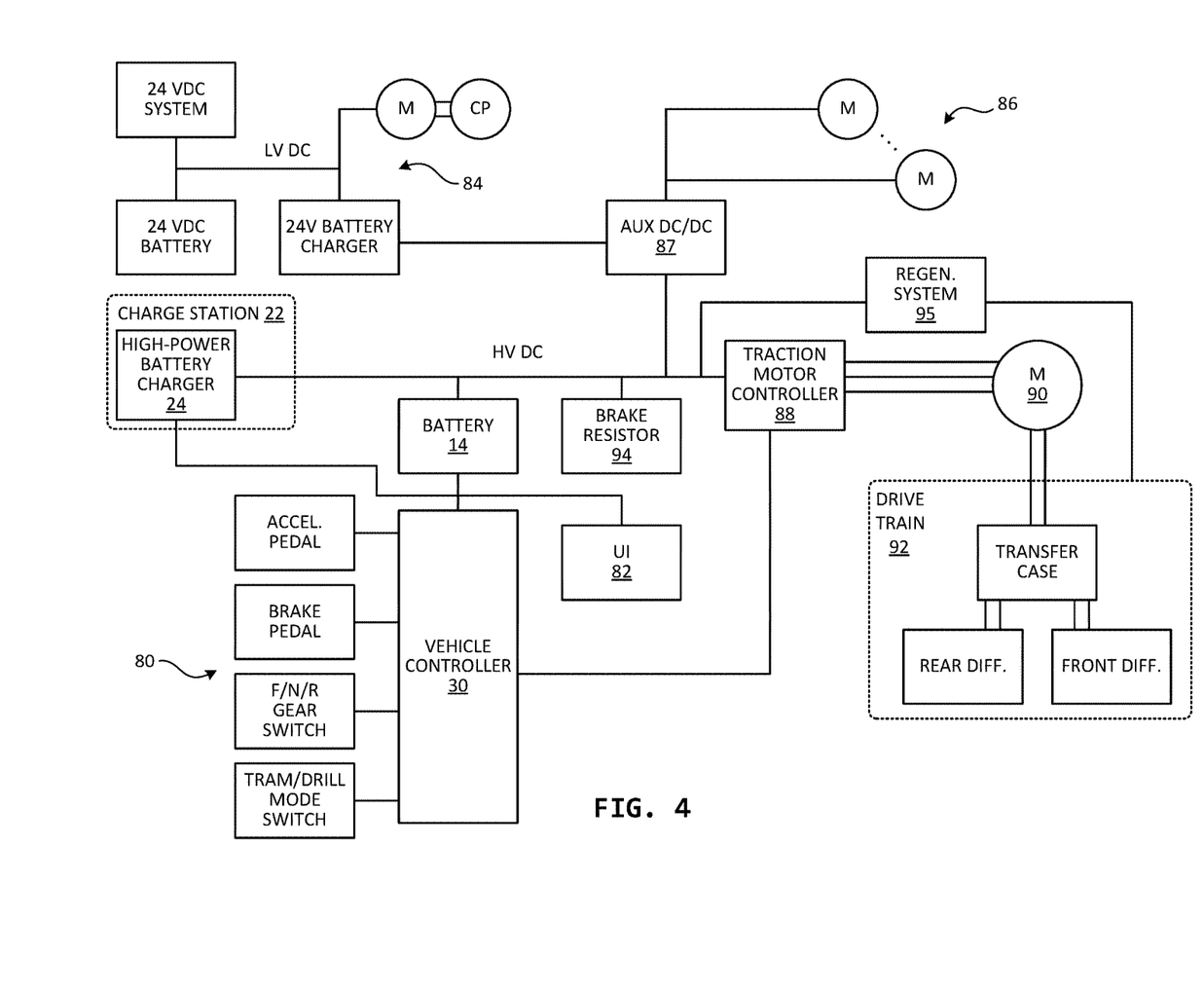
FIG. 4 is a block diagram of the example haul truck and charge station.

FIG. 4 shows further components of the haul truck 10. In addition to the vehicle controller 30 and the drive battery 14, the haul truck 10 can include driver inputs 80, a user interface 82, an auxiliary power system 84, a cooling system 86, an auxiliary DC-DC converter 87, a traction motor controller 88, an electric traction motor 90, a drive train 92, a brake resistor 94, and a regenerative braking system 95, mutually connected as shown. This is merely one example of a haul truck suitable for use with the present invention.

Driver inputs 80 may include electrical or electromechanical devices such as an accelerator pedal, a brake pedal, a gear switch (e.g., for forward, neutral, reverse), a tram/drill mode switch, and the like.

The user interface 82 may include a display, a touch screen, or the like.

The auxiliary power system 84 may be a low-power system and may include a 24 VDC system (e.g., external/internal lighting, instrument panels, etc.), a 24 V battery, a 24 V battery charger, a motor-drive coolant pump (CP), and the like.

The cooling system 86 may include various motors, pumps, and other devices, such as a coolant pump motor, a compressor motor, a water pump motor, a power steering pump motor, and the like.

The auxiliary DC-DC converter 87 may be included to provide power from the high-voltage (HV) circuit to low-voltage (LV) systems, such as the auxiliary power system 84 and the cooling system 86.

The traction motor controller 88 may be configured to distribute power from the battery 14 to the electric traction motor 90. Variable alternating current (AC) pulse-width modulation (PWM) may be used.

The electric traction motor 90 may be configured to provide dual-output power (e.g., 200 kW) to a transfer case of the vehicle drive train 92 to drive rear and front differentials, for example, to move the vehicle.

The regenerative braking system 95 is configured to recover energy from the drive train 92 when braking is commanded by the vehicle controller 30. Recovered energy is provided to charge the battery 14.

Figure 5:
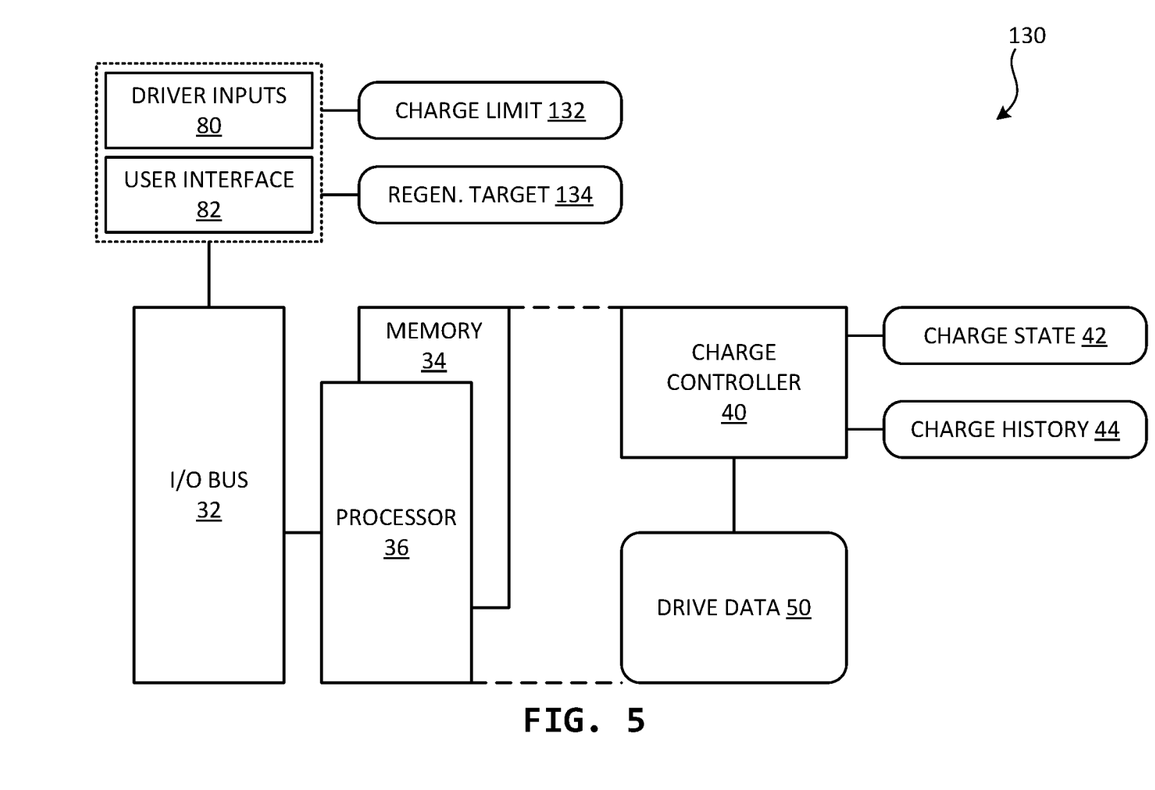
FIG. 5 is a block diagram of another example vehicle controller.

FIG. 5 shows another vehicle controller 130. The vehicle controller 130 is similar to the vehicle controller 30 discussed elsewhere herein and only differences will be discussed in detail. Specific inputs may be received from the operator as electrical or electrical-mechanical inputs as driver inputs 80 and/or via the user interface 82. For example, specific inputs may be received by way of a touchscreen, potentiometer, or similar device.

The charge controller 40 may be configured to reference a specific input from the operator of the vehicle to set a charge limit 132 for the battery 14.

The amount that the battery 14 is to be charged for an upcoming trip may be automatically determined by the charge controller 40 as discussed elsewhere herein. An operator-specified charge limit 132 may be provided to supplement or override an automatically determined charge amount. This may allow the operator to adjust the battery charge level according to a planned route of travel. For example, if the vehicle is parked on top of a ramp/hill and the planned route of travel includes an extended downhill path, the operator may choose to limit the battery charge such that the use of regenerative braking can be maximized. This may have the benefit of extending the life of the mechanical brakes and may limit the use of resistive braking as well as allow for better control of the vehicle while travelling down hill. The charge controller 40 may be configured to use an operator-specified charge limit 132 when provided instead of an automatically determined charge amount. This may be useful of the operator plans to deviate from a normal trip. Alternatively, the charge controller 40 may be configured to use the higher of an operator-specified charge limit 132 and an automatically determined charge amount. This may be useful as a failsafe or if the operator becomes aware of operational changes, such as increased loading to be expected. Alternatively, the charge controller 40 may be configured to use the lower of an operator-specified charge limit 132 and an automatically determined charge amount. This may be useful if the operator becomes aware of operational changes, such as decreased loading to be expected.

An allowed extent of operator control of charge limit 132 may be configurable via a setting at the controller. An absolute minimum and maximum state of charge, regardless of operator input and automatic determination, may be implemented to improve vehicle functionality and battery service lifetime.

The charge controller 40 may be configured to alert the operator when the charge limit 132 has been reached, such as by emitting a sound or displaying a notification at the user interface 82.

The vehicle controller 130 may be configured to reference a specific input from the operator of the vehicle to set a regenerative torque target 134 for a regenerative braking system of the vehicle.

The regenerative torque target 134 may be referenced by the processor 36 in the computation of the maximum allowed speed of the vehicle. The regenerative torque target 134 may be based on the battery's ability to accept regeneration current. This setting may be made automatically by use of a road grade sensor (e.g., a tilt sensor, gyro, etc.) or other way of determining road grade (e.g., mapping, GPS, etc.). The regenerative torque target 134 enables the operator to have maximum speed control of the vehicle while travelling on any downhill grade, which may extend the life of mechanical brakes and reduce the need for resistive braking. The regenerative torque target 134 may be enabled/disabled by the operator if not necessary, which may be useful if the vehicle is travelling on a flat or incline, so as to allow the vehicle to travel at its maximum speed.

The regenerative torque target 134 may be adjusted during on the fly, while the vehicle is being driven.

The multiple advantages of the present invention should be apparent from the above description. For instance, the capacity, and therefore the size and weight, of the battery of the haul truck can be reduced or minimized while still providing for increased or maximized useful operating time as well as improved efficient by a lower proportion of the weight of the haul truck being battery. In addition, charge time can be reduced or minimized by selecting LTO chemistry for the battery and by accounting for regenerative braking on inclined sections of pathway, load indications, and other data.

While the foregoing provides certain non-limiting examples, it should be understood that combinations, subsets, and variations of the foregoing are contemplated. The monopoly sought is defined by the claims.

What is claimed is:

1. A charge controller for an electric mining vehicle, the charge controller configured to determine an amount of charge to be provided to a battery of the electric mining vehicle for an upcoming trip based on regenerative braking power generation and load indication the load indication indicating an amount of load hauled by the electric mining vehicle during a previous trip or to be hauled by the electric mining vehicle during the upcoming trip, the charge controller further configured to command a battery charger to charge the battery up to the determined amount of charge and to stop charging the battery once the determined amount of charge has been reached.

2. The charge controller of claim 1, wherein the charge controller is configured to determine the amount of charge as based on a single upcoming round trip.

3. The charge controller of claim 1, wherein the charge controller is further configured to receive an operator-specified charge limit and to further reference the operator-specified charge limit to determine the amount of charge to be provided to a battery.

4. The charge controller of claim 1, wherein the charge controller is configured to reference the regenerative braking power generation as measured during a descent of the previous trip and is configured to reference the load indication as measured during an ascent of the previous trip.

5. The charge controller claim 4, wherein the charge controller is further configured to reference a backfill indication for an upcoming round trip to determine the amount of charge to be provided to a battery, the backfill indication indicating an amount of backfill to be hauled during the upcoming trip.

6. A haul truck including a drive train, an electric traction motor to drive the drive train, a traction motor controller to control the electric traction motor, a battery to provide electrical power to the electric traction motor, a regenerative braking system, and a vehicle controller that includes a charge controller, the charge controller configured to determine an amount of charge to be provided to the battery for an upcoming trip based on regenerative braking power generation and load indication, the load indication indicating an amount of load hauled by the haul truck during a previous trip or to be hauled by the haul truck during the upcoming trip, the charge controller further configured to command a battery charger to charge the battery up to the determined amount of charge and to stop charging the battery once the determined amount of charge has been reached.

7. The haul truck of claim 6, wherein the battery comprises a lithium-titanate cell.

8. The haul truck of claim 6, wherein the battery charger is external to the haul truck and located at a charging station located at or near a dump point of a mine.

9. The haul truck of claim 6, further comprising the battery charger.

10. The haul truck of claim 6, wherein the charge controller is configured to determine the amount of charge as based on a single upcoming round trip.

11. The haul truck of claim 6, wherein the charge controller is further configured to receive an operator-specified charge limit and to further reference the operator-specified charge limit to determine the amount of charge to be provided to a battery.

12. The haul truck of claim 6, wherein the vehicle controller is configured to reference a regenerative torque target to determine a maximum allowed speed of the vehicle.

13. The haul truck of claim 6, wherein the charge controller is configured to reference the regenerative braking power generation as measured during a descent of the previous trip and is configured to reference the load indication as measured during an ascent of the previous trip.

14. The haul truck of claim 13, wherein the charge controller is further configured to reference a backfill indication for an upcoming round trip to determine the amount of charge to be provided to a battery, the backfill indication indicating an amount of backfill to be hauled during the upcoming trip.

15. The charge controller of claim 1, wherein the charge controller includes logic instructing that a higher amount of load to be hauled by the electric mining vehicle during the upcoming trip requires a higher amount of charge to be provided to the battery of the electric mining vehicle.

16. The charge controller of claim 1, wherein the load comprises ore or waste rock, and the load indication comprises a load weight.

17. The charge controller of claim 1, wherein the load indication comprises an operator-specified load level.

18. The haul truck of claim 6, wherein the charge controller includes logic instructing that a higher amount of load to be hauled by the haul truck during the upcoming trip requires a higher amount of charge to be provided to the battery of the haul truck.

19. The haul truck of claim 6, wherein the load comprises ore or waste rock, and the load indication comprises a load weight.

20. The haul truck of claim 6, wherein the load indication comprises an operator-specified load level.

\* \* \* \* \*